United States Patent [19]
Miller

[11] 3,984,172
[45] Oct. 5, 1975

[54] OPTICAL FIBER TRANSMISSION MEDIUM
[75] Inventor: Calvin Max Miller, Lilburn, Ga.
[73] Assignee: Bell Telephone Laboratories, Incorporated, Murray Hill, N.J.
[22] Filed: Oct. 23, 1973
[21] Appl. No.: 408,380

[52] U.S. Cl. .............................. 350/96 B; 350/96 C
[51] Int. Cl. .................................... G02B 5/16
[58] Field of Search .............. 350/96 B, 96 C; 65/4

[56] References Cited
UNITED STATES PATENTS

| | | | |
|---|---|---|---|
| 3,082,292 | 3/1963 | Gore | 174/117(F) |
| 3,513,045 | 5/1970 | Emmel et al | 156/55 |
| 3,540,956 | 11/1970 | Arnold et al | 156/54 |
| 3,544,192 | 12/1970 | Goldstein | 350/96(B) |
| 3,666,587 | 5/1972 | Nagao | 156/199 |
| 3,736,217 | 5/1973 | Nagao | 161/143 |
| 3,802,974 | 4/1974 | Emmel | 156/55 |

FOREIGN PATENTS OR APPLICATIONS 1,086,823  10/1967  United Kingdom ............... 174/117(F)

Primary Examiner—James W. Lawrence
Assistant Examiner—C. E. Church
Attorney, Agent, or Firm—C. E. Granes

[57] ABSTRACT

An optical fiber ribbon structure is formed by enveloping a plurality of optical fibers with a predetermined spacing between two laminate elements spaced in parallel array. Once formed, either element can be peeled back from the other end from the fibers to expose fibers for subsequent splicing. The forming process embodies the fibers equally in each laminate, forming semicircular grooves in each. These become guide channels for splicing.

3 Claims, 7 Drawing Figures

OPTICAL FIBER TRANSMISSION MEDIUM

This invention relates to optical communications media and more specifically to optical fiber ribbon structures that have particular advantages for manufacture, in stacking to form an optical cable, and in splicing.

BACKGROUND OF THE INVENTION

The advantages of communicating by modulated light waves over an optical fiber medium are now well recognized. Such a system is described, for example, in the article by E. A. J. Marcatili and T. Li, "Research on Optical Fiber Transmission," appearing in the *Bell Labs Record* of December 1971, pages 331–338.

For use as communications paths in the telephone plant, the optical fibers must be grouped for ease of handling and placement. Suitable forms of optical communication cable structures as well as splicing schemes, are indeed critical to a functioning system. One possible building block for an optical communication cable is a fiber ribbon structure which, because of its two-dimension nature, simplifies aligning of the fiber ends to accomplish mass field splicing. The optical fiber ribbon also provides mechanical support and protection. The ribbon structure, by totally enclosing the fibers, can additionally reduce mechanical abrasion and risk of exposure to moisture and other ambient hazards.

Any ribbon structure, however, must especially lend itself readily to simple splicing techniques. Indeed, it is difficult to separate the considerations of ribbon structure and splice structure.

Ideally, an optical communications cable splice should have certain specific features. Gang connection of many or all paths at a time should be reliably possible. Furthermore, the splice should generate as little crosstalk as possible. Also, a splice that does not add excessively to the cross-sectional diameter can reduce or eliminate the cost of splice closures. Of course, any splice must have a minimum of loss and a maximum of simplicity from a craftsman's standpoint.

Accordingly, a principal inventive object is to realize an optical fiber ribbon structure that is especially amenable to splicing.

A second inventive object is to realize an optical fiber ribbon structure that is simple to manufacture.

A specific inventive object is to devise an optical fiber ribbon structure which can be spliced without need of precision alignment and without adding excessive bulk to the ribbon at the splice point.

A further specific object is to devise an optical fiber ribbon structure and related splicing technology and apparatus which is simple for the craftsman in the field to use.

SUMMARY OF THE INVENTION

The invention in a broad sense lies in the realization of an optical fiber ribbon structure consisting of at least an upper and a lower laminate element which fully envelop a plurality of optical fibers thereinbetween and maintain them in spaced, parallel relation. The laminating process involves heating or otherwise deforming upper and lower elements around each optical fiber while holding the fibers spaced apart and parallel. The laminate elements thus formed are in continuous contact either with each other or with the intervening fibers, thus providing a full hermetic seal about the fibers.

Pursuant to one aspect of this inventive structure, the laminate elements are so constructed that once formed, either element can with modest force be peeled away from the other. Either laminate element, when peeled away from the other exposes the enveloped fibers for the subsequent splicing operation.

Laminated optical fiber ribbon is fabricated pursuant to the invention, by supplying fibers from a fiber source through a fiber guide and thence through an advancing upper and lower sheet of laminating material. Before contacting the optical fibers, the advancing laminating material is heated sufficiently to deform around the fibers and physically envelop them, when the assembly thereafter passes through pressure rollers. The material and softening temperatures are selected so that the upper and lower elements can be separated from each other and from the fibers later on by simple physical peeling.

Although each laminate element can advantageously be made up of a single material, such as sheet polyethylene, or polyvinyl chloride, in one embodiment the laminate elements are a dual structure consisting of an inner layer of polyethylene and an outer skin of temperature stable material such as polyethylene terephthalate. Pursuant to this aspect of the invention, the polyethylene is selected to have a low weight average molecular weight so that it readily softens and deforms around the fibers. The outer skin serves to retain the overall geometry of the ribbon structure because it is dimensionally unaffected by the elevated temperature.

It has been found, surprisingly, that the separation of fibers in the ribbon structure of the present invention is much more uniform than the fiber separation obtained in the fiber guide itself. It is believed that this unexpected result is due to a hydraulic force in the soft polyethylene during the lamination process which is exerted on one fiber in an amount inversely proportional to the distance to the next fiber. The interior fibers thus are acted upon by forces that tend to equalize their separation. The exterior fibers may be brought into registration by the same mechanism, by use of dummy fibers which are later removed.

The invention and its further objects, features and advantages will be made more readily apparent from a reading of the description to follow of the illustrative embodiments.

DESCRIPTION OF ILLUSTRATIVE EMBODIMENTS

Figure 1:
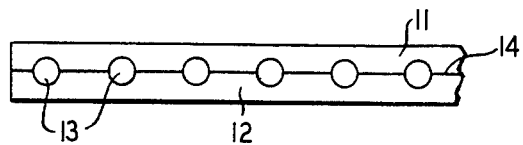
FIG. 1 is an end view of a laminated optical fiber ribbon.

In FIG. 1 there is shown a first embodiment of the inventive laminated optical fiber ribbon consisting of an upper laminate 11 and a lower laminate 12. Embedded or sandwiched between these are a number of substantially equally spaced optical fibers 13.

The laminate elements 11, 12 are advantageously thermoplastic and are selected to bond well to the glass fiber or other coating used on the glass fiber. The fibers 13 are advantageously embedded in the elements 11, 12 so that the interface 14 between the elements 11, 12 is nominally coplanar with each of the axes of all elements 13.

Figure 2:
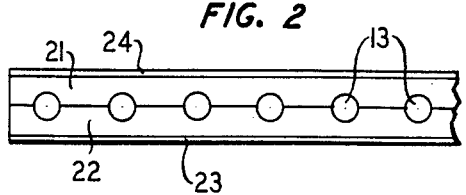
FIG. 2 is a sectional end view of a second embodiment of a laminated fiber ribbon.

In a second embodiment pursuant to the invention, shown in FIG. 2, a dual structure laminate element is used consisting of inner layers 21, 22, which envelop the optical fibers in the manner described for the FIG. 1 embodiment, and outer layers 23, 24 adhered to the exterior sides of the layers 21, 22, respectively. Importantly, the outer layers 23, 24 are characterized by a substantially higher melting temperature than the inner layers, and by the ability to adhere or to remain adhered to the inner layers at elevated processing temperatures at which the inner layers are softened. In a particular embodiment the inner layers 21 and 22 are polyethylene, while the outer layers or skins 23 and 24 are Mylar.

Figure 3:
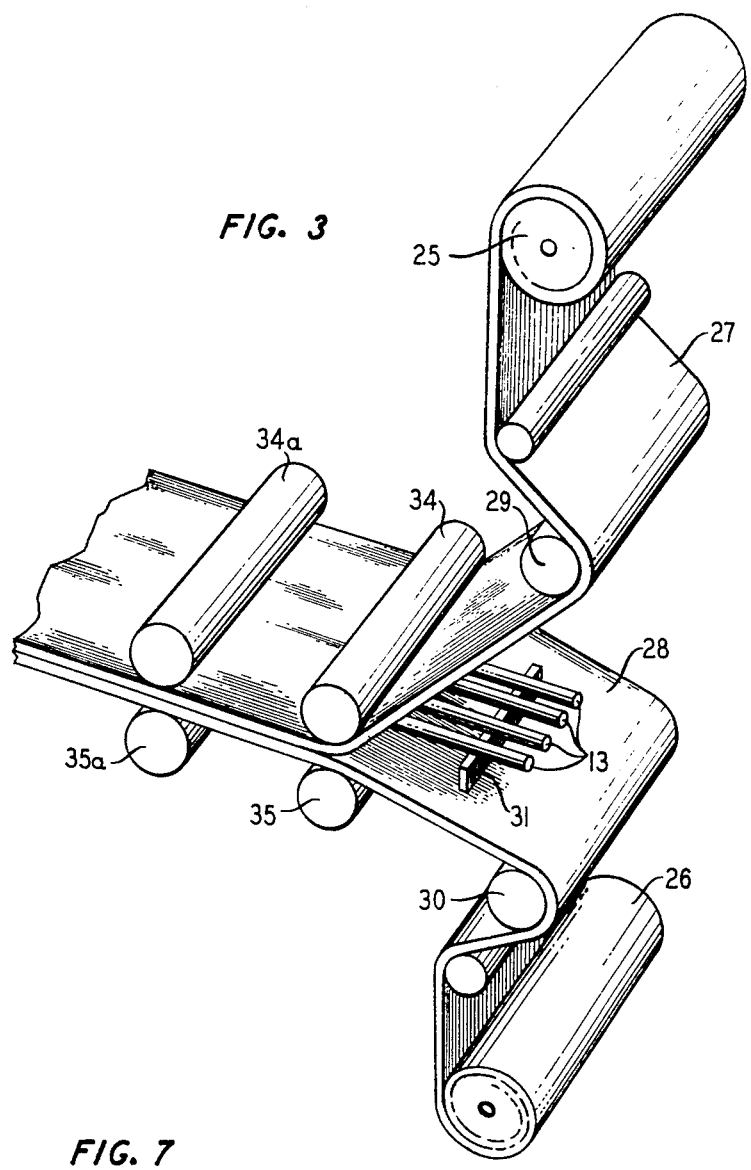
FIG. 3 is a schematic perspective diagram of a laminated fiber ribbon fabrication apparatus.

FIG. 3 shows one suitable process for manufacturing of any of the laminated optical fiber ribbon structures so far described. Upper and lower reels 25, 26 supply sheets of laminate material 27, 28 to heated rollers 29, 30. A plurality of fibers 13 from separate reel sources, not shown, are fed to a fiber guide 31. Any one of several types of guides can be used successfully, including, for example, embossed grooves in plastic, precision aligned tubes, and grooved wheels. Since the laminating process self-aligns fibers, pursuant to one aspect of the invention, the requirements on guides can be relaxed.

Figure 4:
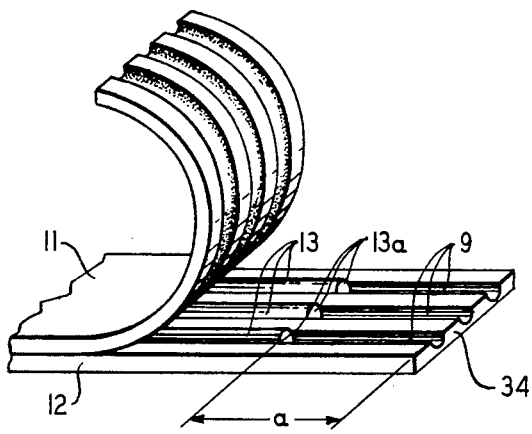
FIGS. 4, 5, and 6 are schematic perspective views showing two laminated optical fiber ribbon structures being spliced.
Figure 5:
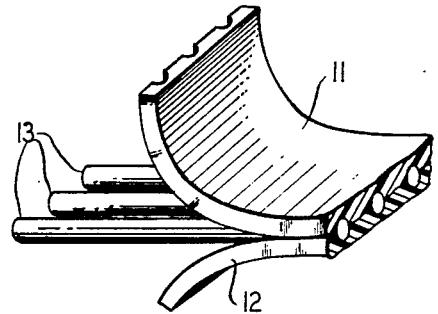

Splicing of any of the optical fiber ribbon structures described may be achieved by producing the two respective end configurations shown in FIGS. 4 and 5. In the FIG. 4 female end, the two laminate elements 11 and 12 are separated from each other by peeling. Then, the fibers 13 are dressed back a distance denoted $a$ and reseated into the grooves 9 of lower laminate 12. Upper laminate 11 is trimmed back slightly so that when it is replaced over the fibers 13, its end will fall between the fiber ends 13a and the joint 34.

Figure 6:
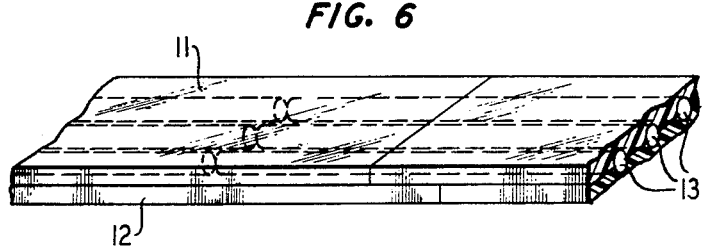

The male connector of FIG. 5 is prepared by peeling apart the upper and lower laminates 11, 12 by dressing back laminate 12 by an amount approximately equal to $a$ and dressing back laminate 11 a lesser amount. Fibers 13 of the male end are then positioned in the grooves 9 of the female end bottom laminate 12 and index-matching fluid is applied. Then, the peeled-back laminates of the male and female connector ends are returned astride the fibers 13. The butt joint in FIG. 6 is the result. Heat may optionally be applied so as to further reseal the upper and lower laminates.

The FIG. 6 assembly is a butt joint, in which the seam along which the two upper laminates 11 join and the seam along which the two lower laminates 12 join, are separated both from themselves and from the region of interface of the fibers 13. This splice is seen to have all of the advantages which the ideal joint described in the Background of the Invention should possess.

Figure 7:
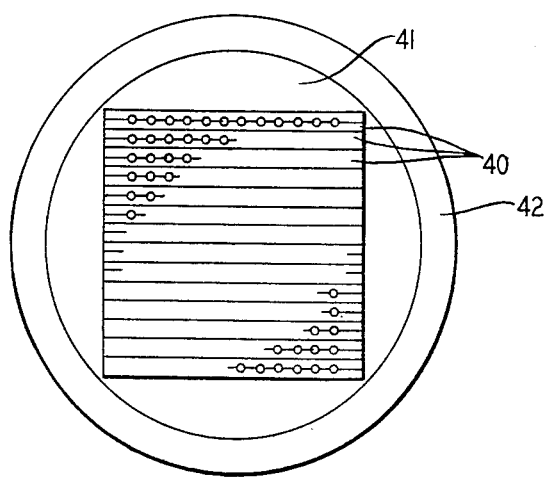
FIG. 7 is a schematic end view of an optical fiber cable design composed of stacks of laminated optical fiber ribbons.

Optical ribbon fiber made pursuant to the invention may advantageously be assembled into an optical fiber cable design, by stacking a number of ribbon structures, denoted 40 together as shown in FIG. 7.

Twelve stacked laminated ribbon structures are shown, each having 12 optical fibers therein embedded making a 144-fiber assembly. This square configuration is rendered round by a filler 41 which may, for example, be polyethlyene. A jacket is placed around the filler to provide mechanical and chemical protection. The ribbons 40 are not adhered to each other in this process, since it is indeed advantageous for them to be decoupled so as to permit the stacked ribbon assembly to be stranded with a minimum of stress. To this end, it is also advantageous for the periphery of the stacked ribbon assembly and the filler to be decoupled, as for example, by a spirally wrapped layer (not shown).

Loss is increased in optical fibers if any mechanical forces are applied. For certain applications it may therefore be advantageous to use loosely coupled structures in order to obtain mechanical flexibility and reduce optomechanical effects. Use of a thick, soft coating, such as a gel, 2 mils in thickness cushions the fiber in the ribbon structure and allows some movement laterally and longitudinally relative to the ribbon structure. The laminated structure of the present invention may be used to obtain such a loose structure if the fibers are coated or wrapped with such material prior to lamination.

It is to be understood that the embodiments described herein are merely illustrative of the principles of the invention. Various modifications may be made thereto by persons skilled in the art without departing from the spirit and scope of the invention. What is claimed is:

1. An optical fiber transmission line comprising first and second optical fiber ribbons each comprising upper and lower plastic laminate elements mutually adhered but separable by peeling, plural spaced parallel optical fibers enveloped between and embedded into said elements of each said ribbon, the embedding region defining a substantially semicircular groove which retains that shape on removal of the embedded fiber and means for connection of said first and second optical fiber ribbons comprising: one end of said first ribbon with the upper and lower laminate elements dressed back so that the optical fibers extend therebeyond; and one end of said second ribbon with the enveloped optical fibers dressed back so that said first and second laminate elements extend therebeyond; the extended optical fibers of said first ribbon reposing in the vacated semicircular grooves of the second optical fiber ribbon.

2. The optical fiber transmission line of claim 1, wherein in said connection the ends of said upper elements butt and the ends of said lower elements butt, and the lines of abutting are longitudinally separated.

3. A communications medium for containing optical fibers in spaced parallel relation, comprising:
   plural parallel optical fibers each having the same circular cross section; and
   an upper and a lower laminating element;
   each said element having a flat exterior surface and a thickness substantially greater than half the diameter of said fibers;
   each said laminating element further comprising a relatively thick inner layer enveloping said fibers and a thin outer layer, said inner layer deformable around said fibers at elevated temperatures and said outer layer being dimensionally stable at elevated temperatures;
   said elements contacting each other and said fibers to keep said elements and fibers normally assembled but separable by peeling;
   the contact region between each said fiber and said element consisting of a semicircular groove, said grooves retaining their cross sectional shape and center-to-center spacing when separated from said fibers.

* * * * *

UNITED STATES PATENT AND TRADEMARK OFFICE
CERTIFICATE OF CORRECTION

PATENT NO. : 3,984,172
DATED : Oct. 5, 1976
INVENTOR(S) : Calvin Max Miller

It is certified that error appears in the above-identified patent and that said Letters Patent are hereby corrected as shown below:

On the first page at [45] "Oct. 5, 1975 should read
--Oct. 5, 1976--.

Signed and Sealed this

Seventeenth Day of May 1977

[SEAL]

Attest:

RUTH C. MASON
Attesting Officer

C. MARSHALL DANN
Commissioner of Patents and Trademarks